US 6,559,994 B1

(12) United States Patent
Chen et al.

(10) Patent No.: US 6,559,994 B1
(45) Date of Patent: May 6, 2003

(54) OPTICAL FIBER TRANSMITTER FOR LONG DISTANCE SUBCARRIER MULTIPLEXED LIGHTWAVE SYSTEMS

(75) Inventors: Wei-Hong Chen, Hsinchu (TW); Winston I. Way, Hsinchu (TW)

(73) Assignee: New Elite Technologies, Inc., Hsinchu (TW)

( * ) Notice: Subject to any disclaimer, the term of this patent is extended or adjusted under 35 U.S.C. 154(b) by 0 days.

(21) Appl. No.: 09/376,594

(22) Filed: Aug. 18, 1999

(51) Int. Cl.[7] .............................................. H04B 10/04
(52) U.S. Cl. ..................... 359/180; 359/130; 359/161; 359/188
(58) Field of Search ................................ 359/180, 188, 359/130, 124, 161

(56) References Cited

U.S. PATENT DOCUMENTS

2002/0030877 A1 * 3/2002 Way et al. .................. 359/183

OTHER PUBLICATIONS

Way, "Subcarrier Multiplexed Lightwave System Design Considerations for Subscriber Loop Applications", Journal of Lightwave Tech., vol. 7, No. 11, pp. 1806–1818, Nov. 1989.*

* cited by examiner

Primary Examiner—Thomas Mullen
(74) Attorney, Agent, or Firm—J.C. Patents

(57) ABSTRACT

An optical fiber transmitter, which consists of a modulated optical source, a pre-distortion circuit, a chirped-fiber grating, an optical circulator or a coupler, is designed to transport subcarrier multiplexed (SCM) signals over a long transmission distance. Here the SCM signals include: analog amplitude-modulated vestigial-sideband (AM-VSB) cable television signals, digital quadrature-amplitude-modulated (QAM) signals, or orthogonal-frequency-division-multiplexed (OFDM) signals, or quadrature-phase-shift-keyed (QPSK) signals, etc. on radio-frequency (RF) or microwave carriers, and/or digital wireless signals on RF, microwave or millimeter wave carriers. The modulated light source can be a directly modulated laser diode, or an external LiNbO3 modulator with a continuous wave (CW) laser diode as the source, or an external electro-absorption modulator with an integrated CW laser diode. The chirped fiber grating has a chromatic dispersion characteristic which is opposite to that of the output transmission path, so that the majority of nonlinear distortions and carrier suppression caused by the optical fiber dispersion in a long-distance system can be significantly reduced. The pre-distortion circuit is used to correct the residual nonlinear distortions and eliminate the residual carrier suppression effect, which cannot be completely eliminated by the chirped fiber grating. The pre-distortion circuit is also used to suppress the residual nonlinear distortions and carrier suppression effects caused by the chirped fiber grating itself.

19 Claims, 9 Drawing Sheets

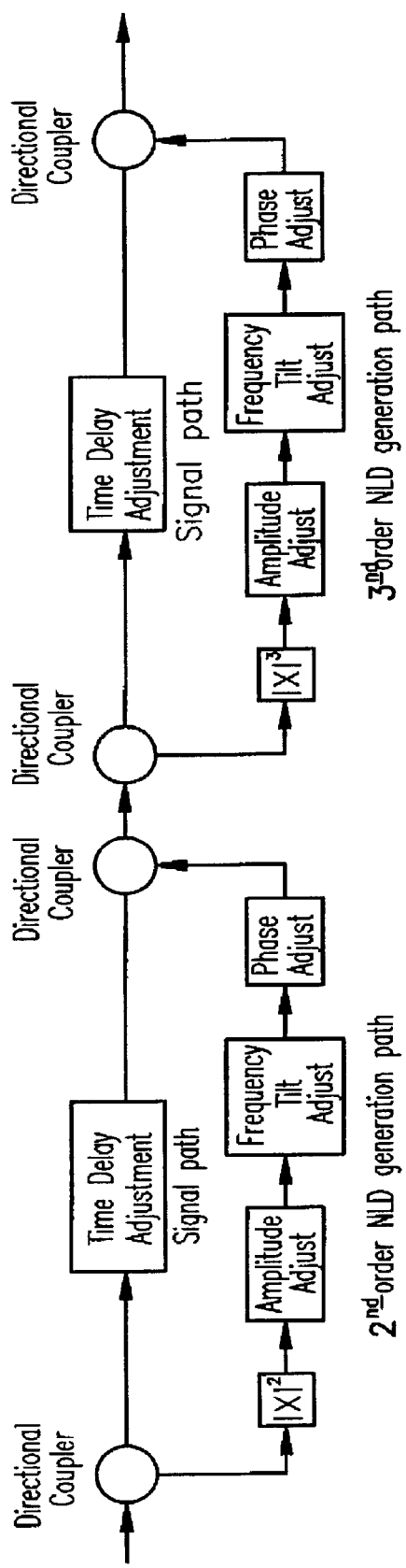
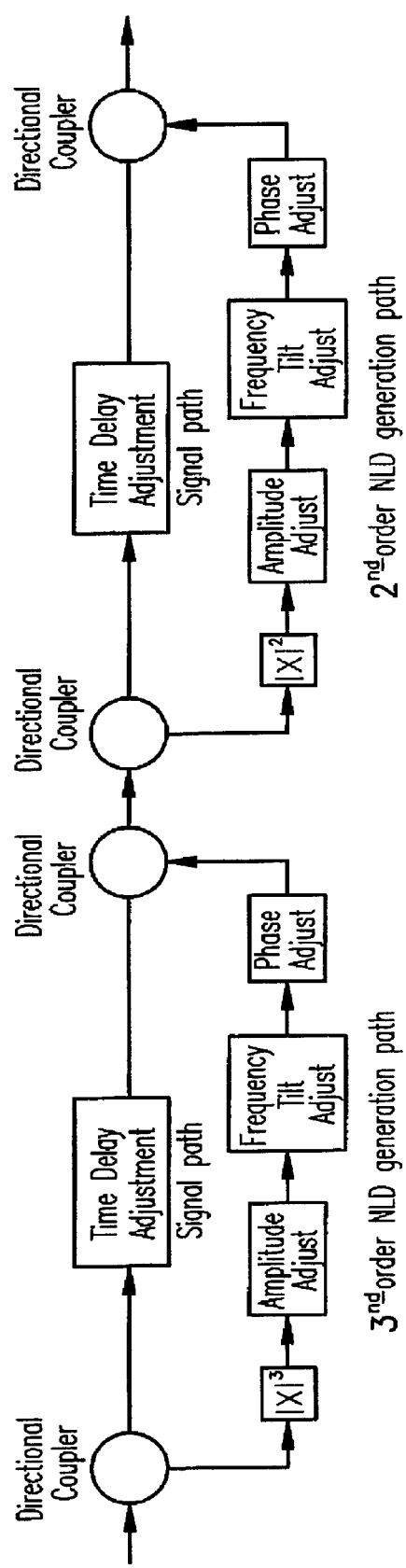
FIG. 3b
FIG. 3c

OPTICAL FIBER TRANSMITTER FOR LONG DISTANCE SUBCARRIER MULTIPLEXED LIGHTWAVE SYSTEMS

BACKGROUND OF THE INVENTION

1. Field of Invention

The present invention relates to an optical fiber transmitter used for long-distance subcarrier multiplexed (SCM) lightwave systems. More particularly, the invention relate to the transmitter using a chirped fiber grating to correct the bulk part of nonlinear distortion, and an electrical predistorter to correct the residual nonlinear distortions.

2. Description of Related Art

Chromatic dispersion in an optical fiber system causes severe degradation of transmission quality. This occurs because chromatic dispersion, fiber non-linearity and the laser frequency chirping (produced by directly modulating a semiconductor laser), can combine to generate nonlinear distortions. For an SCM lightwave system, the non-linear distortions are characterized by one of the following parameters: composite second order (CSO) distortions and composite triple beats (CTB) in analog AM-VSB cable television systems; and carrier-to-intermodulation (C/IM) in digital M-QAM and digital wireless systems. The nonlinear distortions caused by chromatic dispersion becomes more pronounced as the laser frequency chirping increases, the number of RF/microwave channels increases, and optical modulation index per channel (OMI/ch) increases. For example, let us consider a direct modulation system (i.e., using directly modulated laser diode) with 80 analog AM-VSB channels and OMI/ch=4%. If the laser frequency chirp is 6 GHz, then the fiber chromatic dispersion will produce CSOs of about −30 dBc (the requirement is less than about −63 dBc) after an optical fiber transmission distance of 60 km. Therefore, it is necessary to compensate chromatic dispersion so that a long-reach directly modulated SCM system is feasible.

In external modulation systems, there is no concern on laser frequency chirping because the laser is running CW. However, nonlinear distortions can be caused by optical fiber dispersions combining with various factors such as: stimulated Brillouin scattering [Optical Fiber Communication Conference '97, postdeadline paper, PD23-1], self-phase modulation [IEEE PHOTONICS TECHNOLOGY LETTERS, Vol. 3, No. 5, (May, 1991), pp. 481–483], and cross-phase modulation [JOURNAL OF LIGHTWAVE TECHNOLOGY, Vol. 17, No. 2, (February 1999), pp. 178–190]. In addition, there is the so-called carrier suppression effect caused by the combination of optical fiber dispersion and the large external phase modulation on the external modulator. Therefore, regardless of direct or external modulation systems, chromatic dispersion induced nonlinearities must be corrected by using either optical or electrical techniques.

Furthermore, when a 1.55 $\mu$m-band optical fiber amplifier is used in the transmission path of a 1.3 $\mu$m-band single mode fiber (SMF) having been already installed, large positive chromatic dispersion of these fibers in the 1.55 $\mu$m-band becomes a serious problem. Therefore, a dispersion-compensating fiber having large negative chromatic dispersion in the 1.55 $\mu$m wavelength band has been developed. Such a dispersion-compensating fiber (DCF) is disclosed in ELECTRONICS LETTERS, Vol. 30, No. 2, (Jan. 20, 1994), pp. 161–162. However, DCF has the following drawbacks: it could have high nonlinearities caused by high launched optical power (mainly because of its smaller fiber core diameter), it has a large insertion loss, it has a bulk volume, and its cost is high.

On the other hand, chirped fiber grating has been proposed as an alternative way of compensating chromatic dispersion. For example, as disclosed in Optical Fiber Communication Conference '94, postdeadline paper-2, PD2-1 to PD2-4. Recently a linearly chirped fiber grating apodized (or tapered) to alleviate the harmful ripples on reflection and group delay characteristics has been studied, and has been proposed to be used in SCM systems. For example, as disclosed in JOURNAL OF LIGHTWAVE TECHNOLOGY, Vol. 15, No. 2, (February 1997), pp. 179–187. A fiber grating is made of a photo-sensitive optical fiber, with a periodic refractive index change formed in the fiber core by using the ultraviolet rays. A diffraction grating can thus be obtained such that a specific wavelength can be reflected by the diffraction grating.

The refractive index change, that is, the period of the grating is designed to be gradually reduced from the incident side toward the right so that an optical signal of a longer wavelength is reflected at a position nearer the incident side, i.e., longer wavelength experiences a shorter delay. The chirped fiber grating operates so that the wavelength reflected by the aforementioned diffraction grating is shifted in the direction of the length of the fiber, that is, chirped. Since the chromatic dispersion in a conventional 1.3 $\mu$m-zero-dispersion optical fiber causes a longer delay in longer wavelength, a chirped fiber grating can be designed to compensate its effect.

Chirped fiber gratings have been demonstrated as effective chromatic dispersion compensation devices to overcome the chromatic dispersion induced limitations over the long-haul transmission paths. They provide a simple and attractive optical fiber delay, which is polarization-insensitive, inherently fiber compatible, relatively easy to produce, passive and low loss. However fiber gratings are reflective and resonant devices. Uniform strength, chirped fiber gratings have sidelobes in the reflection spectra and nonlinear dispersion characteristics, which are undesirable for optical communications. These effects come from the interference of small reflections from the end of the grating. Fortunately, they can be significantly suppressed by apodizing the grating. An optimized apodization profile improves the performance of the compensation device in the system; however, there still remain slight pseudo-periodic ripples on the reflectivity and group delay characteristics. The period of these ripples depends in the length and the bandwidth of the grating, and has roughly a range of several tens to several hundreds of picometers. In addition, the imperfect fabrication process introduces stochastic variations in the group delay and reflectivity responses. The effects of these group delay and reflectivity ripples on the grating performance in high-speed optical communication systems are investigated in IEEE PHOTONICS TECHNOLOGY LETTERS, Vol. 10, No. 10 (October 1998), pp. 1476–1478.

A chirped fiber grating used for chromatic dispersion compensation is usually designed for a fixed transmission distance unless the chirp amount of the fiber grating is tunable. However, there is usually an about 10% inaccuracy of chromatic dispersion in commercially available chirped fiber gratings. As a result, the extra or insufficient chromatic dispersion due to the employment of a chirped fiber grating can cause additional signal nonlinear distortions in SCM systems.

From the above discussions, we see that the use of a chirped fiber grating can indeed compensate the majority of transmission system chromatic dispersions, but it also causes some residual side effects which are damaging to the signal quality. These side effects are due to its non-ideal dispersion and reflection characteristics, and due to the errors in the amount of dispersions that can be offered by a commercial product. To overcome these problems, we propose using an electrical pre-distortion circuit before the optical laser diode or external modulator. This circuit is designed to generate a controllable amount of second- and third-order nonlinear distortions to compensate those generated from the residual effects aforementioned.

SUMMARY OF THE INVENTION

The invention provides an optical fiber transmitter for long-distance SCM systems. The optical fiber transmitter includes an electrical pre-distortion circuit, an optical modulator, which includes, for example, a laser diode or an external modulator, connected to the pre-distortion circuit, an optical signal directing unit such as an optical circulator or a directional coupler, a chirped fiber grating, and an optical amplifier that is optional. The directing unit has a first, second and third port. An optical signal is directed from the first port to the second port, where the chirped fiber grating is connected. The reflected light from the chirped fiber grating is directed from the second port to the third port, where the transmission optical path is connected. The chirped fiber grating gives the chromatic dispersion characteristic opposite to the chromatic dispersion characteristic of an output transmission path. In the optical transmitter, the electrical SCM signals pass through the pre-distortion circuit, and then externally/directly modulating an optical carrier via the optical modulator, which consists of a directly modulated semiconductor laser diode, or an external modulator with a CW laser diode. The modulated optical signal is launched to the directing unit. An optional optical amplifier can be installed right after the optical modulator or before the output transmission path, and can be a part of the optical transmitter.

The chirped fiber grating and output transmission path have opposite chromatic dispersion characteristic, which means that if the transmission path is a 1.3 $\mu$m-band single mode fiber, the chirped fiber grating has negative chromatic dispersion in the wavelength range used. On the other hand, if the transmission path is a 1.55 $\mu$m-band single mode fiber, the chirped fiber grating has positive chromatic dispersion in the wavelength range used.

According to the optical fiber transmitter of the present invention, a properly designed electrical pre-distortion circuit can be used to significantly reduce the effects of non-ideal chirped fiber grating, and the extra or insufficient chromatic dispersion in using the chirped fiber grating. Furthermore, by using an optical circulator, loss of insertion can be reduced. Alternatively, one can also use a directional coupler instead of an optical circulator.

According to the optical fiber transmitter of the present invention, long-distance SCM lightwave systems minimizing the limitations due to fiber chromatic dispersion and other nonlinearities can become feasible.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 3a–3d are an explanatory view for explaining the pre-distortion circuits;

DESCRIPTION OF THE PREFERRED EMBODIMENTS

The preferred embodiments of the present invention will be described referring to the accompanying drawings as follows.

Figure 1:
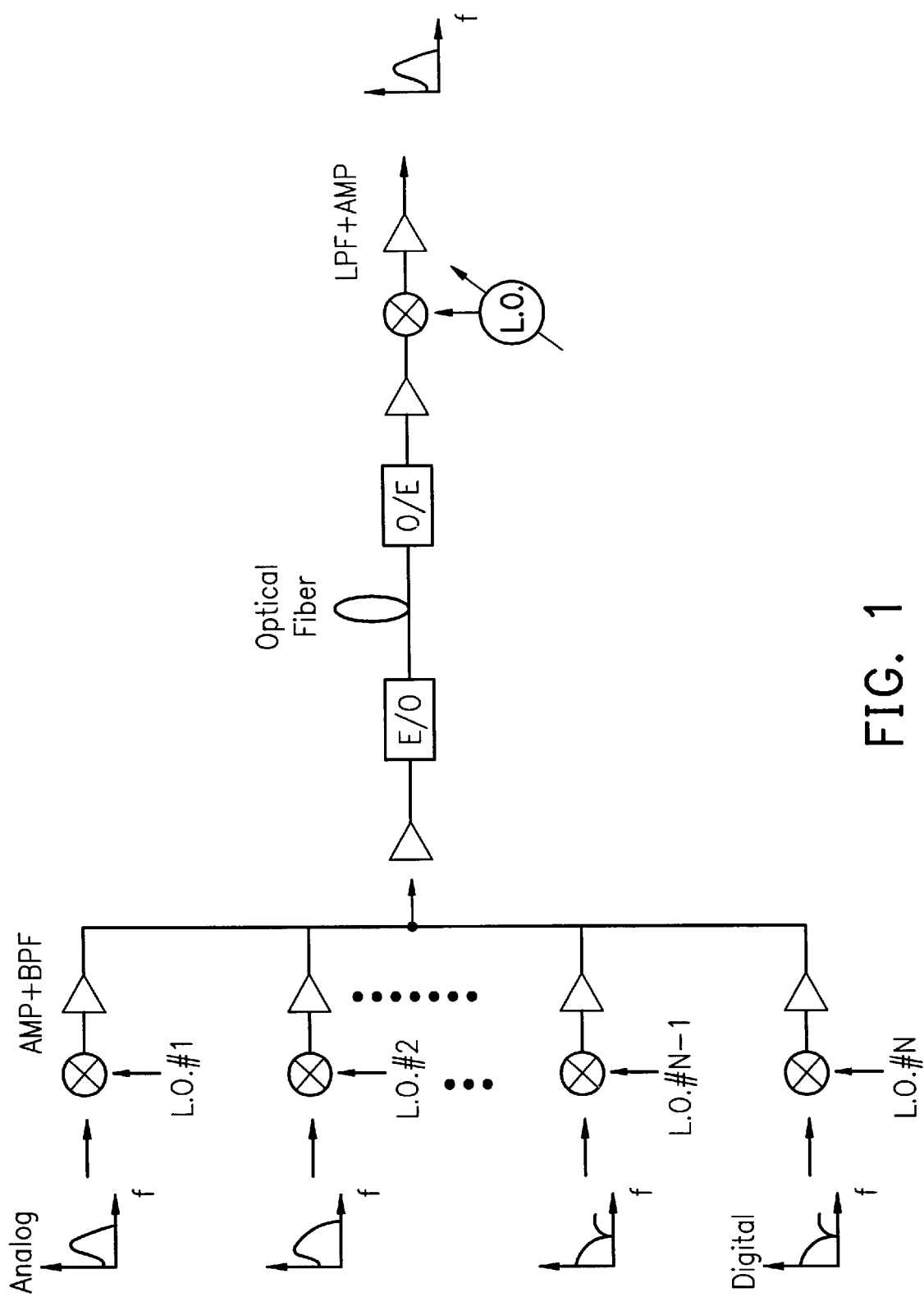
FIG. 1 is an explanatory view for explaining the subcarrier multiplexed lightwave systems.

FIG. 1 is an explanatory view for explaining the subcarrier multiplexed lightwave systems. Radio-frequency (RF) or microwave subcarrier multiplexing (SCM) has emerged as a potentially important multiplexing technique for high-capacity lightwave systems. The terminology "subcarrier multiplexing" should be understood to ecompass the multiplexing of both multichannel analog and/or digital signals. The basic configuration of an SCM system is shown in FIG. 1. A number of baseband analog or digital signals are first frequency-division multiplexed by using local oscillators (LO's) of different radio frequencies in a frequency-division multiplexing (FDM) apparatus. The LO frequencies are the so-called subcarriers in contrast to the optical carrier frequency. At the receiver site, a user can receive any one of the FDM channels by tuning a local oscillator, that downconvert the RF or microwave signals to baseband or IF frequencies, similar to the way we tune in radio or TV channels. The main difference is that SCM lightwave systems can carry much more video, data, or voice channels than radio systems. SCM systems have an advantage over time-division-multiplexed (TDM) baseband digital lightwave systems in that services carried by different subcarriers are independent of each other, and require no synchronization. In addition, SCM systems are more cost-effective than high-capacity TDM lightwave systems, which is an attractive feature for the deployment in broad-band subscriber loop systems.

Figure 2A:
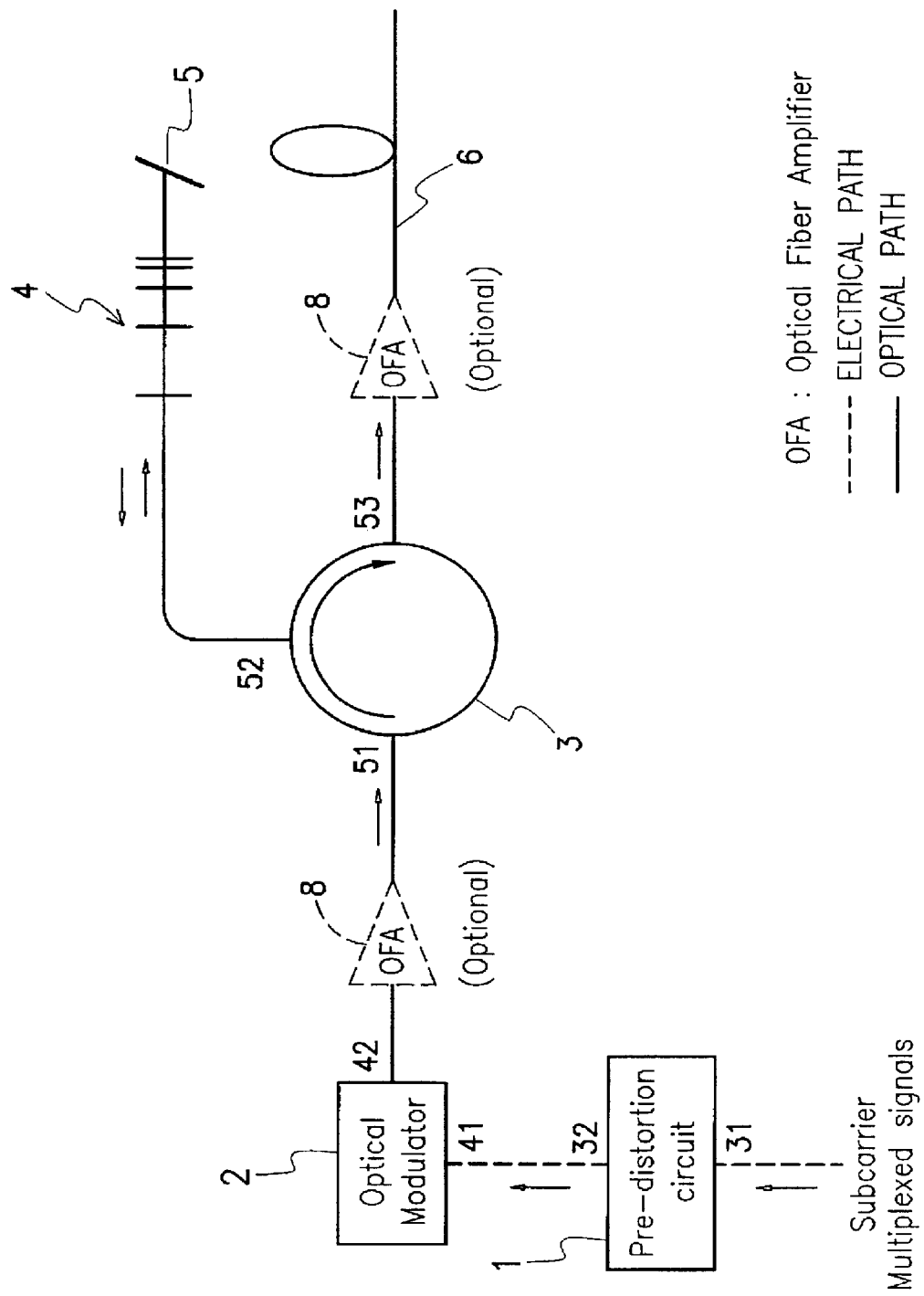
FIG. 2A is an explanatory view for explaining an embodiment of the present invention where an optical circulator is used.
Figure 2B:
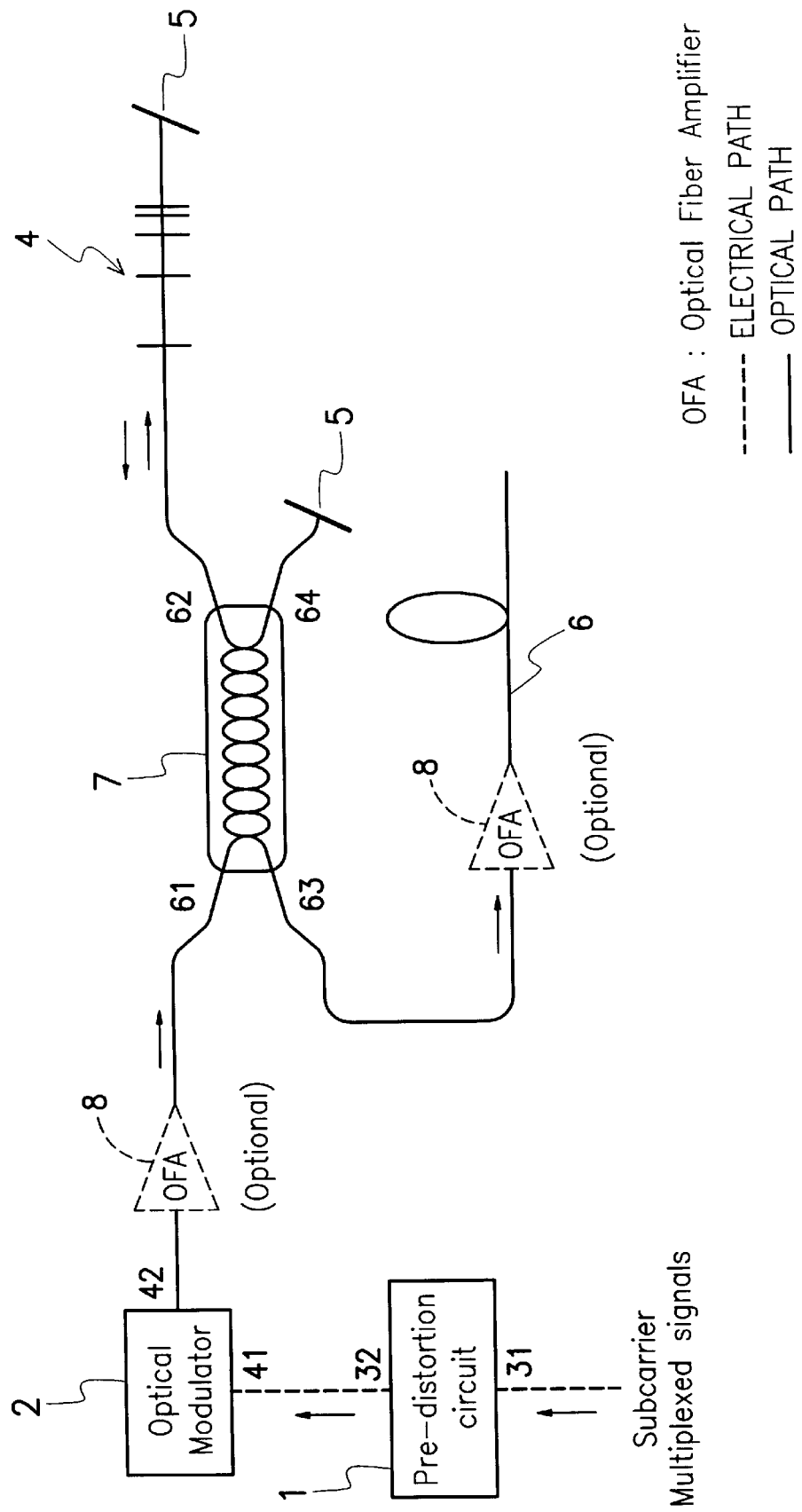
FIG. 2B is an explanatory view for explaining an embodiment of the present invention where a directional coupler is used.

FIG. 2A is an explanatory view for explaining an embodiment of the present invention where an optical circulator is used, and FIG. 2B is an explanatory view for explaining an embodiment of the present invention where a directional coupler is used. In the drawing, the reference numeral 1 represents a pre-distortion circuit; 2, an optical modulator; 3, an optical circulator; 4, a chirped fiber grating; 5, a non-reflective terminal; 6, an output transmission path; 7, a directional coupler; and 8, an optical amplifier (optional).

In FIG. 2A, the electrical subcarrier multiplexed signals are treated as the modulating signals of an optical carrier and input the port 31 of the pre-distortion circuit 1. The pre-distortion circuit 1 is connected to the electrical input port 41 of the optical modulator 2 from the port 32, and the optical output port 42 of the optical modulator 2 is connected to the first port 51 of the optical circulator 3. The third port 53 of the optical circulator 3 is connected to the output transmission path 6. Furthermore, a second port 52 of the optical circulator 3 is connected to the chirped fiber grating 4. The chirped fiber grating 4 is preferably terminated at the non-reflective terminal 5, and there may be an optional optical amplifier 8 installed right after the optical modulator 2 or before the output transmission path 6. For example, the transmission path is formed by a 1.3 μm single mode optical fiber. The chirped fiber grating 4 reflects an optical signal so that the positive chromatic dispersion in the transmission path almost has been compensated by the chirped fiber grating 4 having negative chromatic dispersion, and all the residual nonlinearities are corrected by the pre-distortion circuit.

In FIG. 2B, the directional coupler 7 such as an optical fiber coupler, is used instead of the optical circulator 3 which is a non-reciprocal element shown in FIG. 2A. In FIG. 2B, ports in the left of the directional coupler 7 are referred to as the first port 61 and the third port 63, and ports in the right of the directional coupler 7 are referred to as a second port 62 and a fourth port 64. The optical output port 42 of the optical modulator 2 is connected to the first port 61. The third port 63 is connected to the output transmission path 6. The second port 62 is connected to the chirped fiber grating. The fourth port 64 is preferably terminated at the non-reflective terminal 5. Although an insertion loss not lower than 6 dB arises when the directional coupler 7 is used, the loss can be compensated by an optional optical fiber amplifier.

Figure 3A:
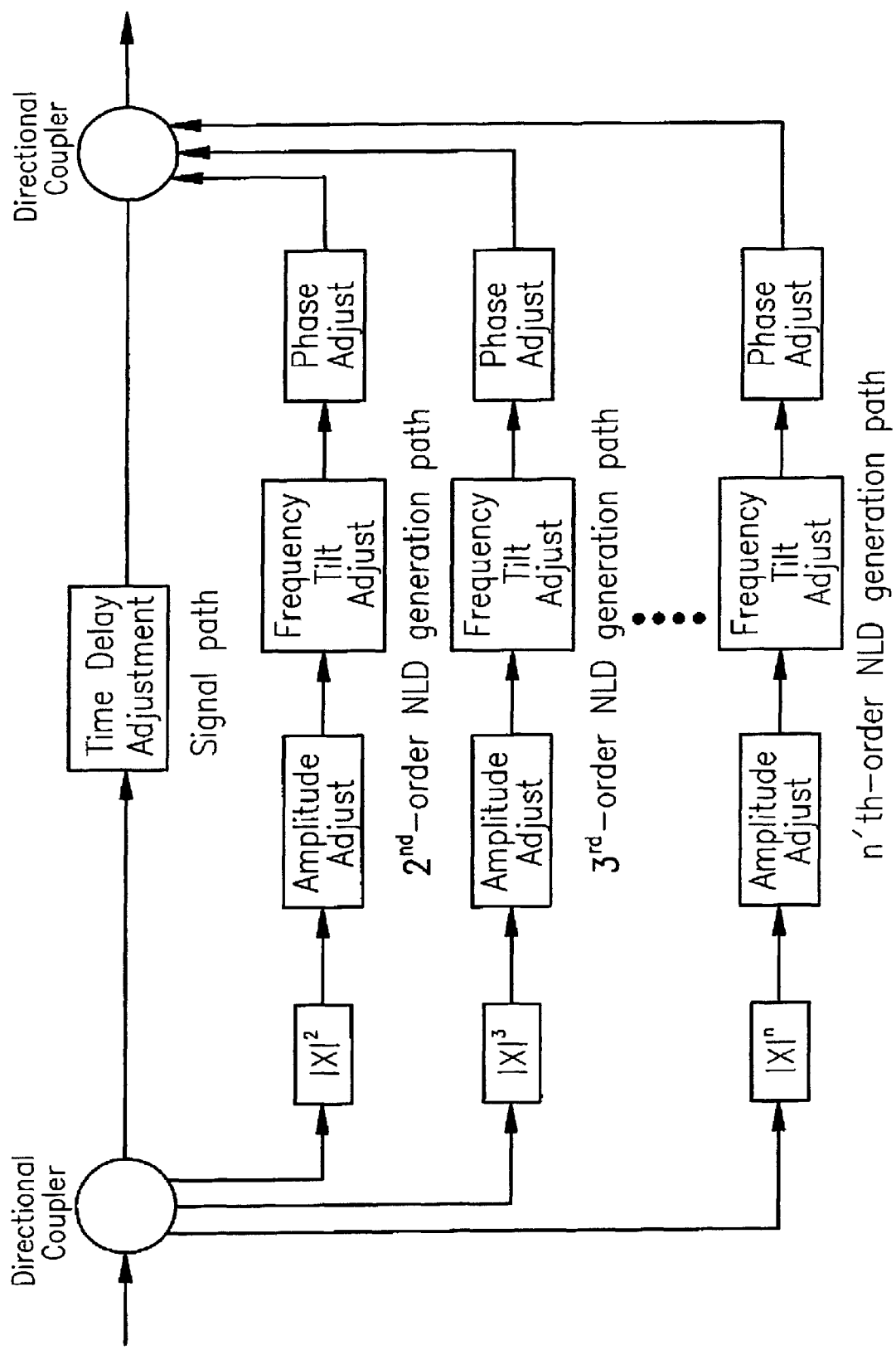

FIGS. 3a–3d are an explanatory view for explaining the pre-distortion circuits. A parallel configuration of a pre-distortion circuit is shown in FIG. 3a. An input signal feeds into a directional coupler and is split into a primary and several secondary electrical paths, which depend on the orders of the nonlinearities needing to be corrected by the pre-distortion circuit in the transmission system. The signal power on the primary path is much larger than that on the secondary paths. The every secondary path is comprised of a n'th order distortion generation block, an amplitude adjustment block, a "tilt" or frequency adjustment block, and a phase adjustment block. Ideally, the fundamental frequency in all secondary paths is suppressed in the distortion generation block by cancellation, filtering, or other means. The magnitude of the generated distortions is adjusted to be the same as that generated in the transmission system, while the phase of the generated distortions is adjusted to be opposite in sign to that generated in the transmission system. In addition, we take advantage of the "tilt" or frequency adjustment block to avoid the distortions generated in the transmission system to be frequency dependent.

Figure 3D:
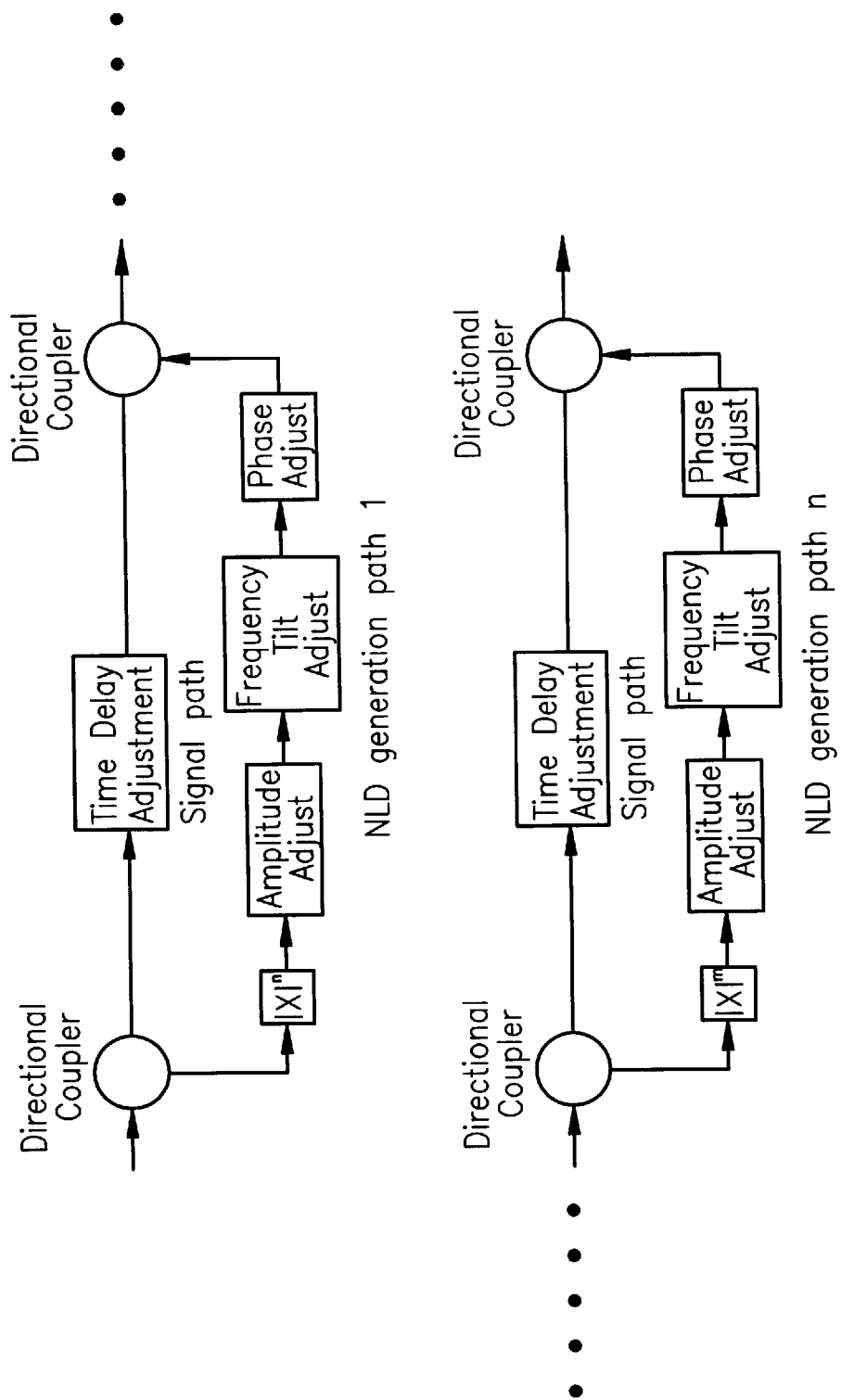

The series configurations of pre-distortion circuits are illustrated in FIGS. 3b–3d. All functions are similar to those in FIG. 3a, except that the input signals pass through the non-linear distortion generators in a series manner. FIGS. 3b and 3c illustrate the cascade of second-order and third-order nonlinear distortion generators. Their sequence depends on how one can minimize the miscellaneous nonlinear distortions unexpectedly generated due to the cascade, FIG. 3d shows a cascade of more than two stages, as a general series configuration, even though it may not be practical to use more than two or three distortion generators along the series path.

Figure 4:
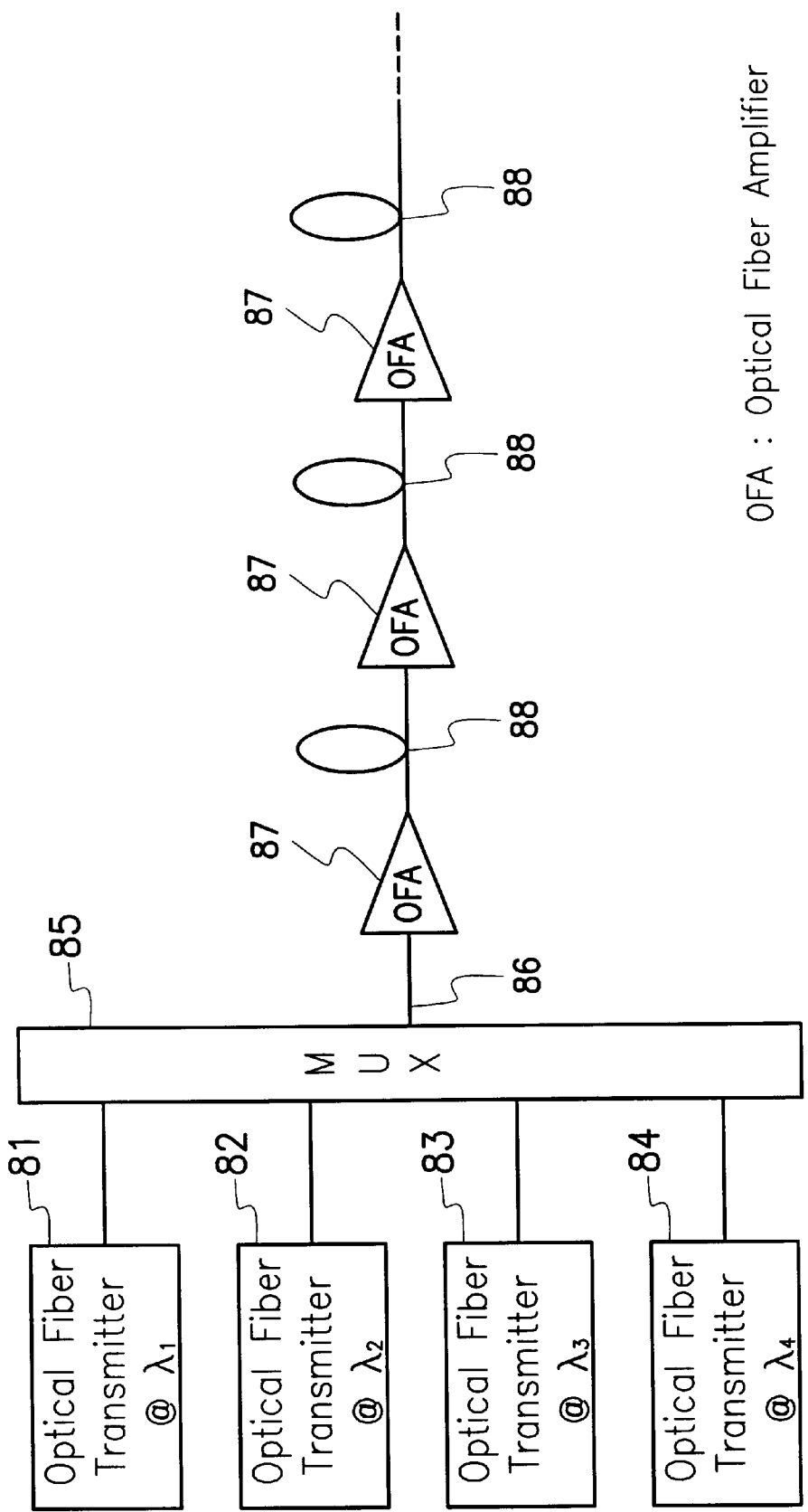
FIG. 4 is an explanatory view for explaining the amplified WDM transmission method.

FIG. 4 is an explanatory view for explaining a transmission method. In the drawing, the reference numeral 81 designates an optical fiber transmitter of present invention for transmitting an optical signal of wavelength $\lambda_1$; 82, optical fiber transmitter of present invention for transmitting an optical signal of wavelength $\lambda_2$; 83, an optical fiber transmitter of present invention for transmitting an optical signal of wavelength $\lambda_3$; 84, an optical fiber transmitter of present invention for transmitting an optical signal of wavelength $\lambda_4$; 85, a multiplexer; 86, a transmission path; 87, an optical amplifiers; 88, a relay transmission path. Now, amplified WDM transmission of four signal wavelengths with present invention as optical fiber transmitters, by way of example, will be explained. In the transmitter side, the optical transmitters of present invention 81 to 84 of wavelengths $\lambda_1$, $\lambda_2$, $\lambda_3$, an $\lambda_4$, are connected to one transmission path 86 by a multiplexer 85. The transmission path 86 is connected to an optical amplifier 87 and the receiver side through one pair of the relay amplifier 87 and the relay transmission path 88 or a plurality of pairs of the relay amplifiers 87 and the relay transmission paths 88.

Figure 5:
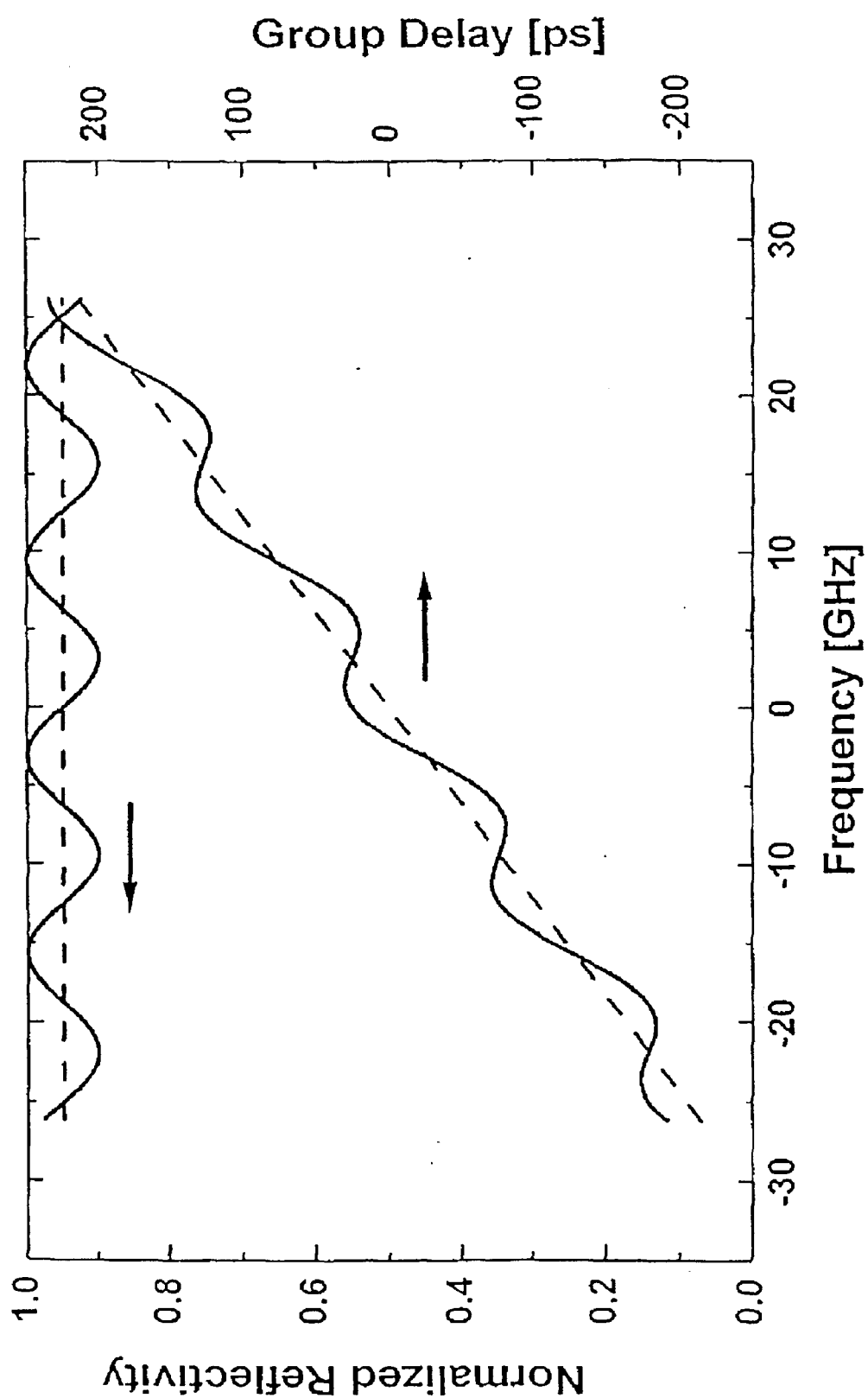
FIG. 5 is an explanatory view for explaining the modified non-ideal dispersion and reflection characteristics of a chirped fiber grating.

FIG. 5 is an explanatory view for explaining the modified non-ideal dispersion and reflection characteristics of a chirped fiber grating. An ideal linear chromatic dispersion compensation device would exhibit a constant reflectivity and linear group delay characteristic, i.e. constant dispersion, over a large operating bandwidth and this has been the main objective of recent developments in grating fabrication. However, as previously discussed it is likely that all chirped fiber gratings will exhibit pseudo-periodic deviations from ideal characteristics, namely ripples. These can be modified by adding periodic functions to the reflectivity and group delay equations of an ideal linear chromatic dispersion compensation device. The grating response is a complex value $R=|R|\cdot e^{-j\Theta}$, where the reflectivity and the associated group delay as a function of the relative angle frequency $\Delta\omega=\omega-\omega_0$ are expressed as $$|R(\Delta\omega)| = 1 - \frac{r_{refl}}{2} \cdot \left[1 + \sin\left(\frac{\Delta\omega}{\Delta f_{refl}} + \phi_{refl}\right)\right]$$

$$\tau(\Delta\omega) = -\beta_2 \cdot L_f \cdot \Delta\omega + \frac{r_{gd}}{2} \cdot \cos\left(\frac{\Delta\omega}{\Delta f_{gd}} + \phi_{gd}\right),$$

where $\omega$ is the angular frequency and $\omega_0$ is the operating optical angular frequency. $r_{refl}$ and $r_{gd}$ are peak-to-peak the amplitudes of the ripples of the reflection and group delay characteristics respectively, and $\Delta f_{refl}$ and $\Delta f_{gd}$ are the periods of the ripples of the reflection and group delay characteristics in frequency unit respectively, which relate to wavelength unit by the equation $$\Delta f = \frac{C}{\lambda_0^2} \Delta\lambda$$

when $\Delta\lambda<<\lambda_0$, where·C is the velocity of the light in vacuum and $\lambda_0$ is the operating optical wavelength. $\phi_{refl}$ and $\phi_{gd}$ separately represent the initial phases of the ripples of the reflection and group delay characteristics with respect to the operating optical wavelength. $\beta_2$, which relates to the chromatic dispersion coefficient D via the equation $$\beta_2 = -\frac{\lambda_0^2}{2\pi C} D,$$

for example, D=17 ps/nm/km for 1.55 μm signal propagating in 1.3 μ single mode fibers, is the second derivative of the propagation constant $\beta$ with respect to the angular frequency $\omega$. And $L_f$ is the fiber length of the transmission path. By integrating the group delay, the phase is given as $$\theta(\Delta\omega) = -\frac{1}{2}\cdot\beta_2\cdot L_f\cdot\Delta\omega^2 + \frac{r_{gd}}{2}\cdot\Delta f_{gd}\cdot\sin\left(\frac{\Delta\omega}{\Delta f_{gd}} + \phi_{gd}\right) + c_0,$$

where $c_0$ is the initial constant of the integration. These expressions above are valid because the grating bandwidth is negligible while compared with the operating optical frequency. Note that the constant group delay, which deduces the linear phase, has been neglected because it has no influences on the system performances.

In FIG. 5, both characteristics of the reflectivity and group delay of a chirped fiber grating are presented. The dash line indicates the ideal case, i.e. constant reflectivity and linear group delay; nevertheless, the solid line shows the case of non-ideal reflection and dispersion characteristics, i.e. existing modified ripples on reflectivity and group delay, with following parameters $r_{refl}$=0.1, $\Delta\lambda_{refl}$=100(pm), $\phi_{refl}$=0°, $r_{gd}$=50 (ps), $\Delta\lambda_{gd}$=100 (pm), $\phi_{gd}$=0°. In both cases, the fiber length of the transmission path $L_f$=60 (km), and the chromatic dispersion coefficient D=17 ps/nm/km are assumed.

Referring back again to FIG. 2A, to correct the nonlinearities, the electrical subcarrier multiplexed signals are launched into the pre-distortion circuit I at the port 31 in advance to generate the nonlinearities needed to cancel those due to the non-ideal chirped fiber grating. Afterward, the electrical signals output from port 32 externally/directly modulate an optical carrier at the port 41 via the optical modulator 2, which consists of a directly modulated semiconductor laser diode, or an external modulator with a CW laser diode. To distinguish between electrical and optical paths in FIG. 2A and FIG. 2B, the former is represented by dash line and the latter is represented by solid line. The optical signal at the output port 42 of the optical modulator 2, for example, having a 1.55 $\mu$m band is injected into the optical circulator 3 at the first port 51, made to go out from the optical circulator 3 at the second port 52 thereof, and reflected by the chirped fiber grating 4. The reflected optical signal is injected into the optical circulator 3 at the second port 52 and made to go out from the optical circulator 2 at the third port 53 thereof toward the output transmission path 6 which is 1.3 $\mu$m single mode fiber. Although most of the nonlinearities caused by chromatic dispersion of the transmission path will be compensated by the chirped fiber grating, there still exists unexpected nonlinearities, which may be the results of the non-ideal reflection and dispersion characteristics of a chirped fiber grating. In addition, the intrinsic nonlinearities of a semiconductor laser and the fiber nonlinearities such as stimulated Brillouin scattering (SBS), self-phase modulation (SPM) and cross-phase modulation (XPM), etc are all possible sources of nonlinear distortions. In conclusion, these nonlinearities and the extra or insufficient chromatic dispersion after chromatic dispersion compensation by a chirped fiber grating can be corrected by a properly designed pre-distortion circuit.

In the aforementioned example, the directional coupler 7 shown in FIG. 2B may be used instead of the optical circulator 3 shown in FIG. 2A, and an optical amplifier used for compensating the loss of insertion of the directional coupler 7 may be given.

Referring to FIGS. 2A and 5, a specific example for explaining the nonlinear effects of the modified non-ideal dispersion and reflection characteristics of a chirped fiber grating used for chromatic dispersion compensation on the composite second order distortions (CSOs) in an AM-VSB optical transmission system will be described. We have known that an optimized apodization profile improves the compensation device performance, however, there still remains slight pseudo-periodic characteristic on the reflection and group delay responses. In addition, the imperfect fabrication process introduces stochastic variations on the reflection and group delay responses. Therefore, it is reasonable for us to investigate nonlinear effects of ripples by adding periodic functions to the reflectivity and group delay equations of an ideal linear chromatic dispersion compensation device as previous descriptions. Note that at present the ripples are not fundamental to the grating but dominated by the fabrication process. Thus, it is likely that these results will be improved with further refinements in grating fabrication.

When we investigate in depth, we will know that the induced CSOs become more serious as the amplitude of ripples is larger and/or the period of ripples is shorter. And, in the same time, nonlinear distortions depend on a significant parameter, frequency chirping, in the system as well. That is to say, the requirements of amplitude and period of ripples are more strict, i.e. the smaller amplitude and/or the longer period, when the frequency chirping of an optical transmission system is larger. Moreover, the initial phase of ripples related to the operating wavelength still has a critical influence on the compensation device performances even when the amplitude and period of ripples have been decided. Let us consider an example of eighty-channel multiplexed and directly modulated analog optical transmission system with optical modulation index of 4% per channel. The chirping defined as the product of the chirping parameter, MHz/mA, and the current above the threshold current of a semiconductor laser is chosen as 6 GHz in order to avoid the effects of double Rayleigh backscattering (DRB) and SBS. The optical power lunched into the transmission path is assumed to be 25 mW without nonlinear SBS effect.

Figure 6:
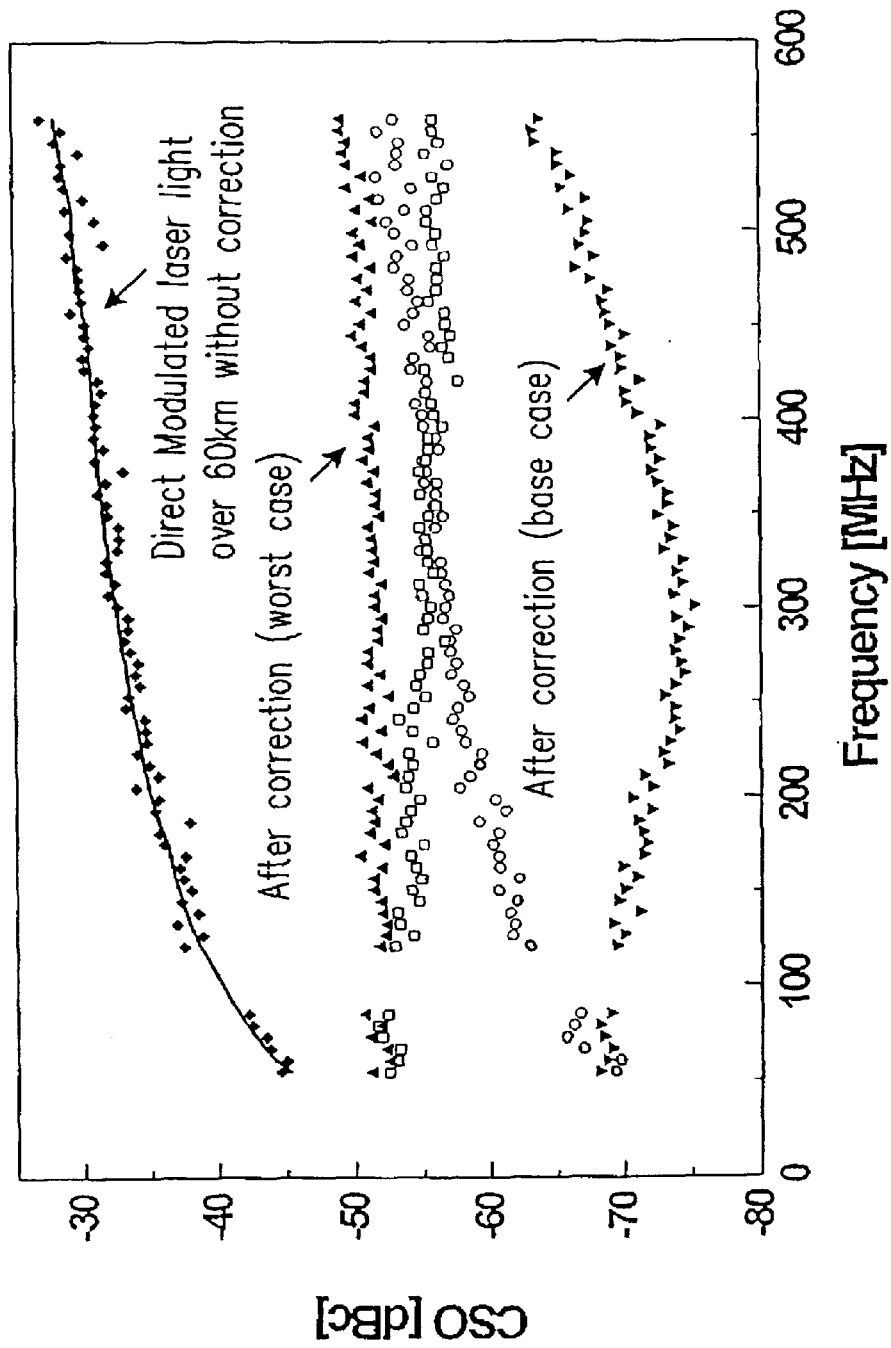
FIG. 6 is an explanatory view for explaining the nonlinear effects of the modified non-ideal dispersion and reflection characteristics of a chirped fiber grating on the composite second order (CSO) distortions in an AM-VSB optical transmission system.

FIG. 6 shows the ratio of composite second order distortions and fundamental carriers as a function of channel frequency. The analytical results after 1.55 um optical signal propagating in 1.3 um single mode fiber of 60 km are presented by solid line, and the chromatic dispersion coefficient D=17 ps/nm/km is assumed. Note that the eighty channels are located according to the NTSC standard frequency plan. The numerical results are presented by solid diamonds, and we can see that both analytical and numerical results match fairly well.

Other plots show the resultant numerical CSOs after chromatic dispersion compensation using a chirped fiber grating with non-ideal reflection and dispersion characteristics. When only the ripples of reflectivity are simulated, ideal group delay response is assumed and the parameters, $r_{refl}$=2.276% (0.2 dB), $\Delta\lambda_{refl}$=1000 (pm), $\phi_{refl}$=0°, are used, we notice that the resultant CSOs presented by hollow squares are lower than −50 dBc, which don't meet the requirement of −63 dBc of analog CATV system, and less frequency dependent. On the other hand, if only the ripples of group delay are considered, the reflection response is ideal and the parameters, $r_{gd}$=20 (ps), $\Delta\lambda_{gd}$=1000 (pm), $\phi_{gd}$=90°, are used, we can see that the resultant CSOs presented by hollow circles are lower than −50 dBc as previous results where only the reflectivity ripples are considered; however, they are frequency dependent from about −70 dBc of the lowest channel at 55.25 MHz to about −50 dBc of the highest channel at 559.25 MHz.

The combined effects of ripples of reflection and group delay characteristics are presented by solid up triangular. And the resultant CSOs are about −50 dBc over the entire interested band, which, at this moment, can be corrected by a pre-distortion circuit. Note that if the CSOs are primarily caused by the ripples of group delay of a chirped fiber grating, then the pre-distortion circuit has to be designed in a more complex manner, such as combined with a gain tilt circuit. In addition, the phases of the nonlinearities generated via the pre-distortion circuit in advance and the phases of the nonlinearities that intended to be corrected have to be out of phase over the entire interested band.

When the initial phases of ripples of the reflectivity and group delay, $\phi_{refl}$ and $\phi_{gd}$, change to be 90° and 0° respectively, the best case can be obtained and presented by solid down triangular. We can see that the difference due to the initial phases reaches to be around 20 dB; therefore, that is why it is necessary to integrate a pre-distortion circuit in an optical fiber transmitter like present invention to avoid the shift of initial phase of the ripples of a chirped grating used for dispersion compensation. The shift of initial phase may be attributed to the instabilities of the central wavelength of a grating and/or the variations of a laser wavelength due to the unstable operation temperature. Note that the plot of the solid down triangular is the comprehensive results of the dispersion compensation using a non-ideal chirped fiber grating as a chromatic dispersion compensation device and the fiber nonlinear mechanism named self-phase modulation.

As is apparent from the above description, in accordance with the present invention, besides the extra or the insufficient chromatic dispersion after compensated by the chirped fiber grating, the nonlinearities caused by the non-ideal reflection and dispersion characteristics, the intrinsic nonlinearities of a semiconductor laser and the fiber nonlinearities along the transmission path, etc can be corrected by the properly designed pre-distortion circuit. As a result, an optical fiber transmitter using chirped fiber grating and pre-distortion circuit for long distance subcarrier multiplexed lightwave systems has been carried out without lowering of transmission quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical fiber transmitter for long-distance subcarrier multiplexed (SCM) lightwave systems, the optical fiber transmitter comprising:

a pre-distortion circuit, used to receive electrical subcarrier multiplexed signal;

an optical modulator, receiving an output of the pre-distortion circuit;

an optical signal directing device having a first port, a second port, and a third port, in which the first port receives an output of the optical modulator that is directed to the second port;

a chirped fiber grating which is connected to the second port of the optical signal directing device;

an output transmission path which is connected to the third port of the optical signal directing device;

a first fiber optical amplifier, installed between the optical modulator and the optical signal directing device;

wherein the electrical subcarrier multiplexed signals pass through the pre-distortion circuit to generate nonlinearities in advance;

wherein the electrical subcarrier multiplexed signals, combined with the nonlinearities, modulate an optical carrier via the optical modulator;

wherein as the output of the optical modulator is received by the optical signal directing device at the first port, the output of the optical modulator is directed to the chirped fiber grating, which is connected to the second port of the directing device, and the modulated light is reflected from the fiber grating back to the optical signal directing device through the second port, and then exported to the output transmission path from said third port;

wherein the chirped fiber grating has a chromatic dispersion characteristic which is opposite to that of the output transmission path;

wherein a bulk part of nonlinear distortions and carrier suppression effects caused by the accumulated optical fiber dispersion in the system is compensated by the chirped fiber grating;

wherein the residual nonlinear distortions and the residual carrier suppression effects, which cannot be completely eliminated by the chirped fiber grating, are corrected by the pre-distortion circuit;

wherein the residual nonlinear distortions and carrier suppression effects caused by the chirped fiber grating itself are corrected by the pre-distortion circuit as well;

wherein the first optical fiber amplifier is used to compensate for the insertion loss of the optical signal directing device and the chirped fiber grating, and the transmission loss of the long distance systems.

2. The optical fiber transmitter of claim 1, wherein the electrical subcarrier multiplexed signals comprise analog amplitude-modulated vestigial-sideband (AM-VSB) cable television signals on radio-frequency (RF) or microwave carriers.

3. The optical fiber transmitter of claim 1, wherein the electrical subcarrier multiplexed signals comprise digital quadrature-amplitude-modulated (QAM) signals on RF or microwave carriers.

4. The optical fiber transmitter of claim 1, wherein the electrical subcarrier multiplexed signals comprise orthogonal-frequency-division-multiplexed (OFDM) signals on RF or microwave carriers.

5. The optical fiber transmitter of claim 1, wherein the electrical subcarrier multiplexed signals comprise quadrature-phase-shift-keyed (QPSK) signals on RF or microwave carriers.

6. The optical fiber transmitter of claim 1, wherein the electrical subcarrier multiplexed signals comprise digital wireless signals on RF, microwave or millimeter wave carriers.

7. The optical fiber transmitter of claim 1, wherein the electrical subcarrier multiplexed signals comprise hybrid signals including analog AM-VSB, digital M-QAM signals and digital wireless signals on RF, microwave or millimeter wave carriers.

8. The optical fiber transmitter of claim 1, wherein the optical modulator comprises a direct modulator.

9. The optical fiber transmitter of claim 1, wherein the optical modulator comprises an external modulator.

10. The optical fiber transmitter of claim 1, further comprising a second optical fiber amplifier which is installed in the output transmission path connected to the third port.

11. The optical fiber transmitter of claim 1, wherein the optical signal directing device comprises an optical circulator.

12. The optical fiber transmitter of claim 1, where in the optical signal directing device comprises a directional coupler.

13. The optical fiber transmitter of claim 12, wherein the optical signal directing device comprise a fourth port.

14. The optical fiber transmitter of claim 13, wherein said fourth port has a non-reflective terminal.

15. The optical fiber transmitter of claim 1, wherein the output transmission path is comprised of 1.3 um-band single mode fiber.

16. The optical fiber transmitter of claim 1, wherein the output transmission path is comprised of 1.55 um-band single mode fiber.

17. The optical fiber transmitter of claim 1, wherein the chirped fiber grating comprises a non-reflective terminal.

18. An optical fiber transmitter for long-distance subcarrier multiplexed (SCM) lightwave systems, the optical fiber transmitter comprising:

a pre-distortion circuit, used to receive electrical subcarrier multiplexed signal;

an optical modulator, receiving an output of the pre-distortion circuit;

an optical signal directing device having a first port, a second port, and a third port, in which the first port receives an output of the optical modulator that is directed to the second port;

a chirped fiber grating which is connected to the second port of the optical signal directing device; and an output transmission path which is connected to the third port of the optical signal directing device, wherein the electrical subcarrier multiplexed signals pass through the pre-distortion circuit to generate nonlinearities in advance, wherein the electrical subcarrier multiplexed signals, combined with the nonlinearities, modulate an optical carrier via the optical modulator, wherein as the output of the optical modulator is received by the optical signal directing device at the first port, the output of the optical modulator is directed to the chirped fiber grating, which is connected to the second port of the directing device, and the modulated light is reflected from the fiber grating back to the optical signal directing device through the second port, and then exported to the output transmission path from said third port, wherein the chirped fiber grating has a chromatic dispersion characteristic which is opposite to that of the output transmission path, wherein a bulk part of nonlinear distortions and carrier suppression effects caused by the accumulated optical fiber dispersion in the system is compensated by the chirped fiber grating, wherein the residual nonlinear distortions and the residual carrier suppression effects, which cannot be completely eliminated by the chirped fiber grating, are corrected by the pre-distortion circuit, and wherein the residual nonlinear distortions and carrier suppression effects caused by the chirped fiber grating itself are corrected by the pre-distortion circuit as well.

19. The optical fiber transmitter of claim 18, further comprising an optical fiber amplifier which is installed in the output transmission path connected to the third port.

* * * * *